United States Patent
Endo et al.

(10) Patent No.: US 10,096,401 B2
(45) Date of Patent: Oct. 9, 2018

(54) WIRE HARNESS AND WIRE HARNESS PRODUCTION METHOD

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Satoshi Endo, Mie (JP); Shigeto Kato, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/561,757

(22) PCT Filed: Mar. 11, 2016

(86) PCT No.: PCT/JP2016/057810
§ 371 (c)(1),
(2) Date: Sep. 26, 2017

(87) PCT Pub. No.: WO2016/158321
PCT Pub. Date: Oct. 6, 2016

(65) Prior Publication Data
US 2018/0082765 A1    Mar. 22, 2018

(30) Foreign Application Priority Data
Mar. 31, 2015    (JP) .................... 2015-072602

(51) Int. Cl.
*H01R 11/00* (2006.01)
*H01B 7/00* (2006.01)
(Continued)

(52) U.S. Cl.
CPC ........... *H01B 7/0045* (2013.01); *B60R 16/02* (2013.01); *B60R 16/0215* (2013.01);
(Continued)

(58) Field of Classification Search
CPC ...... H01R 11/00; H01R 25/003; H01R 31/06; H01B 7/0045
See application file for complete search history.

(56) References Cited

U.S. PATENT DOCUMENTS 4,972,042 A * 11/1990 Seabourne ........... G02B 6/4428
                                                         174/23 R
5,399,812 A * 3/1995 Woszczyna ......... B60R 16/0215
                                                         138/115
(Continued)

FOREIGN PATENT DOCUMENTS

JP    63-074023    5/1988
JP    06-003649    1/1994
(Continued)

OTHER PUBLICATIONS

Search Report issued in International Bureau of WIPO Patent Application No. PCT/JP2016/057810, dated Apr. 12, 2016.

*Primary Examiner* — Tho D Ta
(74) *Attorney, Agent, or Firm* — Greenblum & Bernstein, P.L.C.

(57) ABSTRACT

In order to provide a technique for obtaining a wire harness with a shape closer to that when arranged in a vehicle, a wire harness in which three or more branch line portions branch from a trunk line portion and end portions of the branch line portions are respectively provided with connectors,
(Continued)

includes: a holding member that holds the branch line portions such that a connector is positioned away from one of the three or more connectors in a first direction that is orthogonal to a terminal insertion direction and a connector is positioned away from that one connector in a second direction that is orthogonal to the first direction, when the trunk line portion is held such that the connectors are suspended.

8 Claims, 9 Drawing Sheets

(51) Int. Cl.
  *B60R 16/02* (2006.01)
  *H01B 7/18* (2006.01)
  *H01B 13/012* (2006.01)
  *H01R 25/00* (2006.01)
  *H01R 31/06* (2006.01)
  *H01R 9/11* (2006.01)

(52) U.S. Cl.
  CPC ..... *H01B 7/1805* (2013.01); *H01B 13/01209* (2013.01); *H01R 9/11* (2013.01); *H01R 11/00* (2013.01); *H01R 25/003* (2013.01); *H01R 31/06* (2013.01)

(56) References Cited

U.S. PATENT DOCUMENTS

| | | | | |
|---|---|---|---|---|
| 5,945,635 | A * | 8/1999 | Suzuki | H01B 13/01209 140/93 R |
| 7,118,410 | B2 * | 10/2006 | Hatori | H01R 9/2416 439/501 |
| 8,653,372 | B2 * | 2/2014 | Muneyasu | H01B 7/0045 174/110 R |
| 8,981,241 | B2 * | 3/2015 | Okuyama | H02G 15/007 174/168 |
| 2015/0129723 | A1 * | 5/2015 | Hanaoka | H02G 3/30 248/51 |

FOREIGN PATENT DOCUMENTS

| | | |
|---|---|---|
| JP | 2000-106046 | 4/2000 |
| JP | 2003-168517 | 6/2003 |
| JP | 2004-022188 | 1/2004 |
| JP | 2013-038873 | 2/2013 |
| JP | 2014-007030 | 1/2014 |

* cited by examiner

WIRE HARNESS AND WIRE HARNESS PRODUCTION METHOD

TECHNICAL FIELD

The present invention relates to a wire harness installed on a vehicle.

BACKGROUND ART

Some wire harnesses installed on vehicles are three-dimensionally arranged in the vehicles. When assembling such a wire harness to be three-dimensionally arranged in a vehicle in this manner, typically, it is two-dimensionally laid out and assembled on an assembly drawing board. Thus, when laying out the two-dimensionally assembled wire harness into a three-dimensional shape, problems occur such as the wire harness being partially twisted.

If the wire harness is twisted, the route of the electric wires constituting the wire harness becomes longer than expected, for example, and thus an operation called tuning to readjust a design value of the electric wire length may be required. A technique for suppressing such twisting is disclosed, for example, in Patent Document 1.

The method for designing a wire harness described in Patent Document 1 is to minimize twisting, by placing a first wire and a second wire or a support member on a main virtual jig face and sub virtual jig faces such that a predetermined binding condition is satisfied.

CITATION LIST

Patent Documents

Patent Document 1: JP 2004-22188A

SUMMARY OF INVENTION

Technical Problem

However, the approach described in Patent Document 1 requires calculating an expected twisting amount and the like, and thus the design may be complex. Furthermore, even with the approach described in Patent Document 1, twisting may still occur.

It is an object of the present invention to provide a technique for obtaining a wire harness with a shape closer to that when arranged in a vehicle.

Solution to Problem

In order to solve the above-described problems, a first aspect is directed to a wire harness in which three or more branch line portions branch from a trunk line portion and end portions of the branch line portions are respectively provided with connectors, including: a holding member that holds the branch line portions such that a connector is positioned away from one of the three or more connectors in a first direction that is orthogonal to a terminal insertion direction and a connector is positioned away from that one connector in a second direction that is orthogonal to the first direction, when the trunk line portion is held such that the connectors are suspended, wherein the three or more connectors are located in a positional relationship of that when arranged in a vehicle, when the trunk line portion is held such that the connectors are suspended, the holding member includes branch line grouping parts that can be joined to each other, the branch line grouping parts are respectively attached to the branch line portions, and, when the branch line grouping parts are joined to each other, the branch line portions are located in a positional relationship of that when arranged in a vehicle, and the branch line grouping parts include magnets, and the branch line grouping parts can be joined to each other using the magnets.

A second aspect is directed to the wire harness according to the first aspect, wherein the holding member includes a binding member for binding the plurality of branch line portions.

A sixth aspect is directed to the wire harness according to the first or second aspects, wherein a protecting member is attached around a branch position in which the branch line portions branch from the trunk line portion.

A seventh aspect is directed to the wire harness according to the sixth aspect, wherein the protecting member is made of a heat shrinkable resin.

An eighth aspect is directed to a wire harness production method including: a step (a) of preparing a plurality of connectors into which terminals of terminal-attached electric wires have been inserted; a step (b) of supporting the plurality of connectors such that a connector is positioned away from one of the connectors in a first direction that is orthogonal to a terminal insertion direction and a connector is positioned away from that one connector in a second direction that is orthogonal to the first direction; and a step (c) of holding the terminal-attached electric wires respectively inserted into the plurality of connectors, at a branch position, in a state where the plurality of connectors are supported, wherein the method further includes: a step (g) of, before the step (c), measuring a dimension from the connectors in a state where the branch position has not been positioned, and determining the branch position, in the step (c), the terminal-attached electric wires are held at the determined branch position, the method further includes: a step (d) of attaching branch line grouping parts that can be joined to each other, around the terminal-attached electric wires; and a step (e) of joining the branch line grouping parts to each other, and the branch line grouping parts are formed so as to be able to be joined to each other using a magnetic force.

A ninth aspect is directed to the wire harness production method according to the eighth aspect, wherein the step (b) includes a step of supporting the plurality of connectors at locations thereof when arranged in a vehicle.

A twelfth aspect is directed to the wire harness production method according to the eighth or ninth aspect, wherein the branch line grouping parts are formed so as to be able to be attached to and detached from the terminal-attached electric wires, and the branch line grouping parts are formed such that interlocking therebetween can be canceled, and the method further includes: a step (f) of, after the step (c), detaching the branch line grouping parts from the terminal-attached electric wires, and canceling the interlocking between the branch line grouping parts.

Advantageous Effects of Invention

According to the first, second, sixth and seventh aspects, a wire harness in which three or more branch line portions branch from a trunk line portion and end portions of the branch line portions are respectively provided with connectors, comprises: a holding member that holds the branch line portions such that a connector is positioned away from one of the three or more connectors in a first direction that is orthogonal to a terminal insertion direction and a connector is positioned away from that one connector in a second direction that is orthogonal to the first direction, when the trunk line portion is held such that the connectors are suspended. Thus, it is possible to obtain a wire harness with a shape closer to that when arranged in a vehicle.

In particular, according to the second aspect, the wire harness is such that the holding member includes a binding member for binding the plurality of branch line portions. Thus, holding and binding can be simultaneously performed, and thus it is possible to obtain a wire harness with a shape closer to that when arranged in a vehicle.

Furthermore, according to the first aspect, the wire harness is such that the three or more connectors are located in a positional relationship of that when arranged in a vehicle, when the trunk line portion is held such that the connectors are suspended. Thus, it is possible to obtain a wire harness with a shape closer to that when arranged in a vehicle.

Furthermore, according to the first aspect, the wire harness is such that the holding member includes branch line grouping parts that can be joined to each other, and the branch line grouping parts are respectively attached to the branch line portions, and, when the branch line grouping parts are joined to each other, the branch line portions are located in a positional relationship of that when arranged in a vehicle. Thus, if the branch line portions are located using the branch line grouping parts, the portions from the branch line grouping parts to the respective ends can be easily formed in a shape closer to that when arranged in a vehicle, and the shape can be easily maintained.

Furthermore, according to the first aspect, the wire harness is such that the branch line grouping parts include magnets, and the branch line grouping parts can be joined to each other using the magnets. Thus, the branch line grouping parts can be easily joined to each other. Accordingly, the shape of the wire harness can be easily formed.

In particular, according to the sixth aspect, the wire harness is such that a protecting member is attached around a branch position in which the branch line portions branch from the trunk line portion. Thus, it is no longer necessary to wrap tape in units of electric wires (electric wire bundle) inserted into each connector, in the vicinity of the branch position.

In particular, according to the seventh aspect, the wire harness is such that the protecting member is made of a heat shrinkable resin. Thus, the protecting member can be easily attached.

According to the eighth, ninth, twelfth and fourteenth aspects, a wire harness production method includes: a step (a) of preparing a plurality of connectors into which terminals of terminal-attached electric wires have been inserted; a step (b) of supporting the plurality of connectors such that a connector is positioned away from one of the connectors in a first direction that is orthogonal to a terminal insertion direction and a connector is positioned away from that one connector in a second direction that is orthogonal to the first direction; and a step (c) of holding the terminal-attached electric wires respectively inserted into the plurality of connectors, at a branch position, in a state where the plurality of connectors are supported. Thus, it is possible to obtain a wire harness with a shape close to that when arranged in a vehicle.

In particular, according to the ninth aspect, the wire harness production method is such that the step (b) includes a step of supporting the plurality of connectors at locations thereof when arranged in a vehicle. Thus, it is possible to obtain a wire harness with a shape closer to that when arranged in a vehicle.

Furthermore, according to the eighth aspect, the wire harness production method is such that the method further includes: a step (d) of attaching branch line grouping parts that can be joined to each other, around the terminal-attached electric wires; and a step (e) of joining the branch line grouping parts to each other. Thus, the wire harness can be easily formed in a shape close to that when arranged in a vehicle.

Furthermore, according to the eighth aspect, the wire harness production method is such that the branch line grouping parts are formed so as to be able to be joined to each other using a magnetic force. Thus, the branch line grouping parts can be easily joined to each other.

Furthermore, according to the twelfth and fourteenth aspects, the wire harness production method is such that the branch line grouping parts are formed so as to be able to be attached to and detached from the terminal-attached electric wires, and the branch line grouping parts are formed such that interlocking therebetween can be canceled, and the method further includes: a step (f) of, after the step (c), detaching the branch line grouping parts from the terminal-attached electric wires, and canceling the interlocking between the branch line grouping parts. Thus, the branch line grouping parts can be repeatedly used. Furthermore, since the wire harnesses installed on vehicles is not provided with the branch line grouping parts, the weight of the wire harness can be accordingly reduced.

Furthermore, according to the eighth aspect, the wire harness production method is such that the method further includes: a step (g) of, before the step (c), measuring a dimension from the connectors, and determining the branch position, wherein, in the step (c), the terminal-attached electric wires are held at the determined branch position. Thus, for example, it is possible to allow robots such as industrial robots that have a self-measuring function to produce the wire harness. In this case, a drawing board for producing the wire harness can be omitted, and operations such as transferring the wire harness to a drawing board and the like can be omitted.

DESCRIPTION OF EMBODIMENTS

First Embodiment

Figure 1:
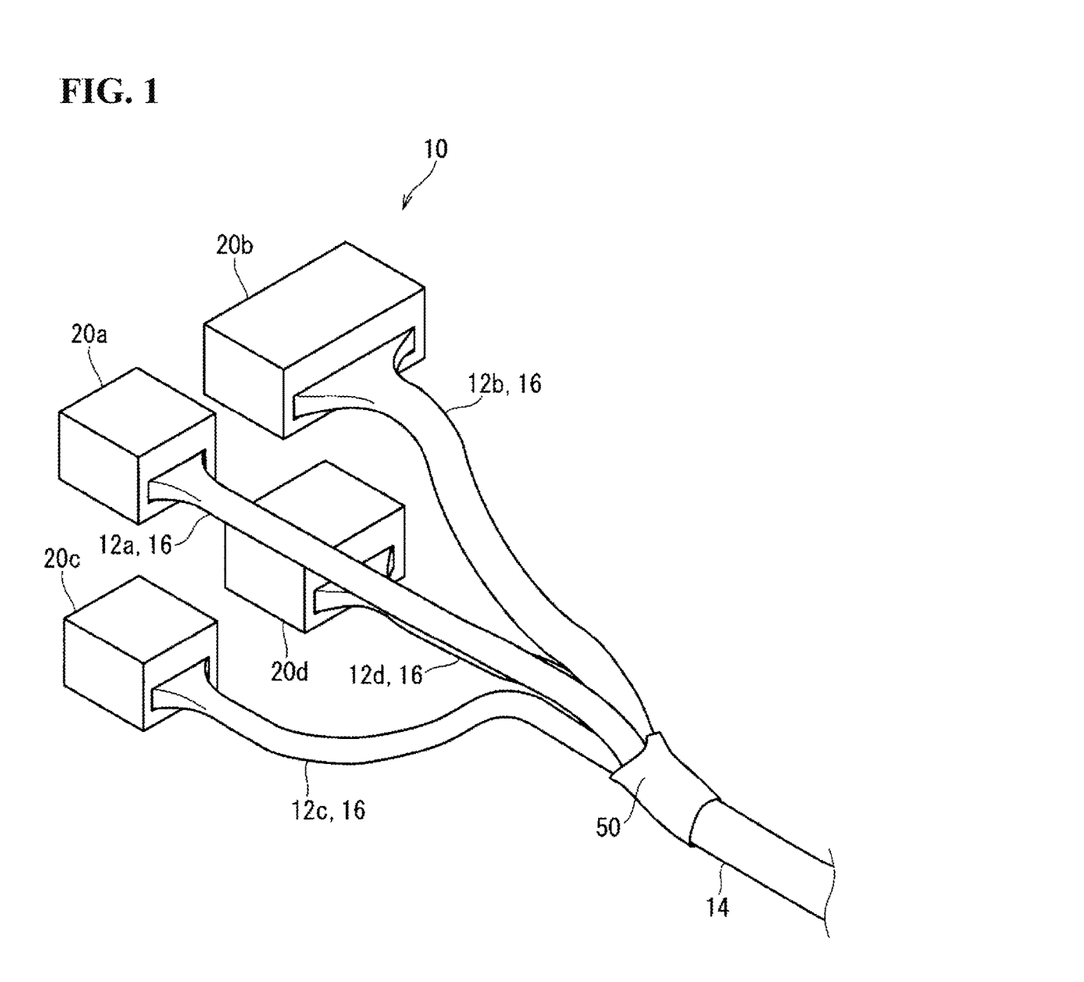
FIG. 1 is a perspective view showing a wire harness according to a first embodiment.
Figure 2:
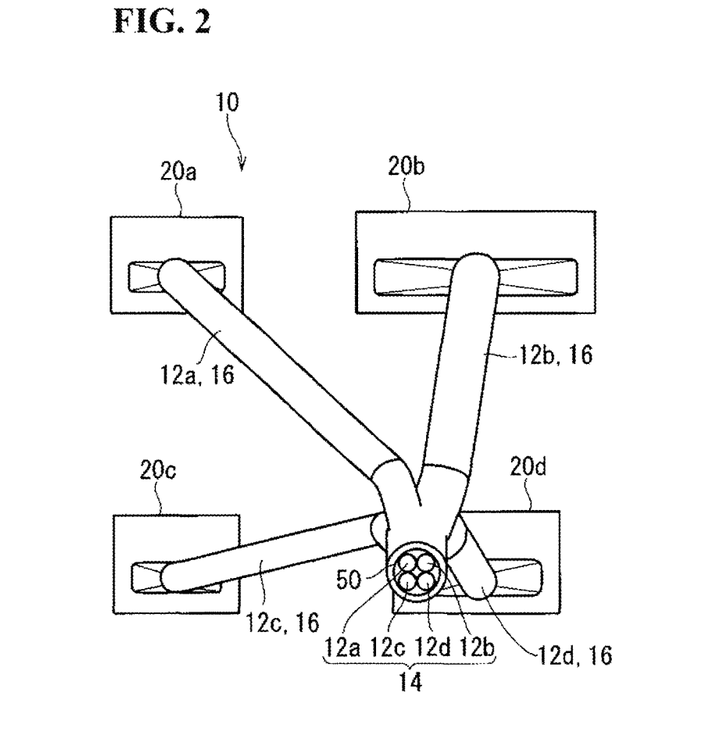
FIG. 2 is a front view showing the wire harness according to the first embodiment.
Figure 3:
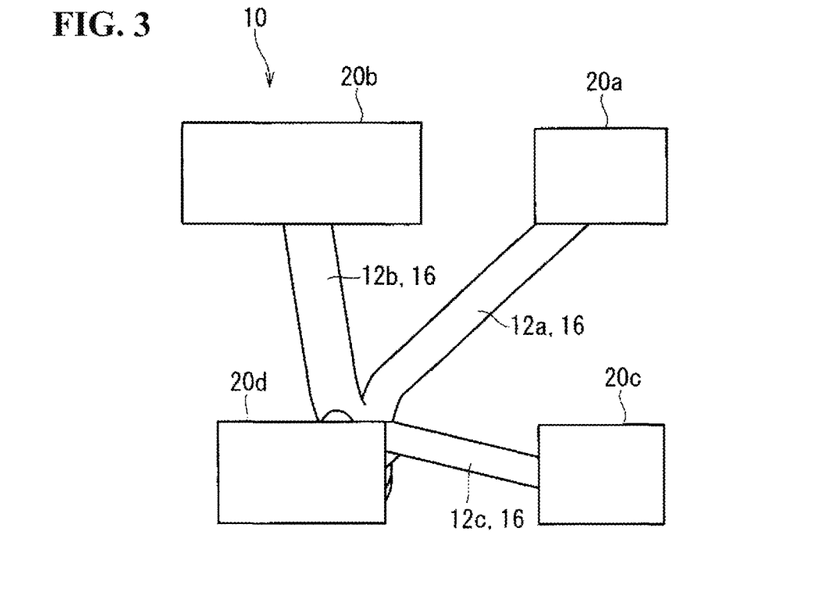
FIG. 3 is a rear view showing the wire harness according to the first embodiment.

Hereinafter, a wire harness 10 and a production method thereof according to a first embodiment will be described. FIG. 1 is a perspective view showing the wire harness 10 according to the first embodiment. FIG. 2 is a front view showing the wire harness 10 according to the first embodiment. FIG. 3 is a rear view showing the wire harness 10 according to the first embodiment. Note that FIG. 2 is a diagram showing the wire harness 10 from the rear side in the terminal insertion direction, and FIG. 3 is a diagram showing the wire harness 10 from the front side in the terminal insertion direction.

Wire Harness

The wire harness 10 is configured such that three or more branch line portions 16 branch from a trunk line portion 14. In this example, four branch line portions 16 branch from the trunk line portion 14. The end portions of the branch line portions 16 are respectively provided with connectors 20. In this example, the wire harness 10 includes a holding member 50.

The holding member 50 holds the branch line portions 16 such that a connector 20 is positioned away from one of the three or more connectors 20 in a first direction that is orthogonal to the terminal insertion direction and a connector 20 is positioned away from that one connector 20 in a second direction that is orthogonal to the first direction, when the trunk line portion 14 is held such that the connectors 20 are suspended. In other words, it is sufficient that three or more connectors 20 are not arranged in one straight line when viewed from the terminal insertion direction, when the trunk line portion 14 is held such that the connectors 20 are suspended. The first direction may be set as appropriate, for example, to a direction in which a connector 20 is positioned away from one connector 20 in a direction that is orthogonal to the terminal insertion direction in which terminals are inserted into connectors 20.

Specifically, the four connectors 20 are respectively taken as a connector 20a, a connector 20b, a connector 20c, and a connector 20d. The connector 20b is positioned away from the connector 20a in the first direction that is orthogonal to the terminal insertion direction. Hereinafter, the direction connecting the connector 20a and the connector 20b is referred to as the first direction. The connector 20c is positioned away from the connector 20a in the second direction that is orthogonal to the terminal insertion direction and the first direction. The connector 20d is positioned away from the connector 20a in the first direction and the second direction.

The holding member 50 includes a binding member or binder for binding a plurality of branch line portions 16. In this example, tape is used as the binding member or binder. The above-described positional relationship is maintained by wrapping tape in the vicinity of the branch position.

It will be appreciated that the holding member 50 does not necessarily have to include a binding member. The holding member may be, for example, a member for grouping the branch line portions 16, such as branch line grouping parts 60 described later. Furthermore, even in the case where the holding member 50 includes a binding member, tape does not necessarily have to be used as the binding member. Examples of the binding member include a cable tie.

Furthermore, in this example, the three or more connectors 20 are located in the positional relationship of that when arranged in a vehicle, when the trunk line portion 14 is held such that the connectors 20 are suspended.

There is no limitation on the locations of the connectors 20 when arranged in a vehicle as long as at least the plurality of connectors 20 are arranged in the same order as that when arranged in a vehicle, and the intervals between the connectors 20 may be different from those when installed on a vehicle. At this time, when supporting and producing the connectors 20, even in the case where the intervals between the connectors 20 are set to be the same as those when installed on a vehicle, the intervals may vary due to deformation caused by the weight of the connectors 20 when suspended, for example.

More specifically, terminal-attached electric wires 12 respectively inserted into the connectors 20 are held by the holding member 50 at the branch position, and thus the portions of the terminal-attached electric wires 12 from the branch position to the connectors 20 function as the branch line portions 16, and the portion thereof from the branch position to the side opposite to the connectors 20 functions as the trunk line portion. At this time, when attaching the holding member 50 in the vicinity of the branch position, terminal-attached electric wires 12a, 12b, 12c, and 12d may be bundled together or may not be bundled together.

Even in the case where the terminal-attached electric wires 12a, 12b, 12c, and 12d are not bundled together, the connectors 20 are located in the positional relationship of that when arranged in a vehicle, by attaching the holding member 50 in a state where the terminal-attached electric wires 12a, 12b, 12c, and 12d are grouped in the vicinity of the branch position in a state where the connectors 20a, 20b, 20c, and 20d are each supported.

In the case where the terminal-attached electric wires 12a, 12b, 12c, and 12d are bundled together, as shown in FIG. 2, the connectors 20 are located in the positional relationship of that when arranged in a vehicle, by attaching the holding member 50 in a state where the locations of the terminal-attached electric wires 12a, 12b, 12c, and 12d respectively match the locations of the connectors 20a, 20b, 20c, and 20d.

In this example, the three or more connectors 20 are located such that the locations of the connectors 20 respectively match those when arranged in a vehicle, when the trunk line portion 14 is held such that the connectors 20 are suspended.

Production Method

Figure 4:
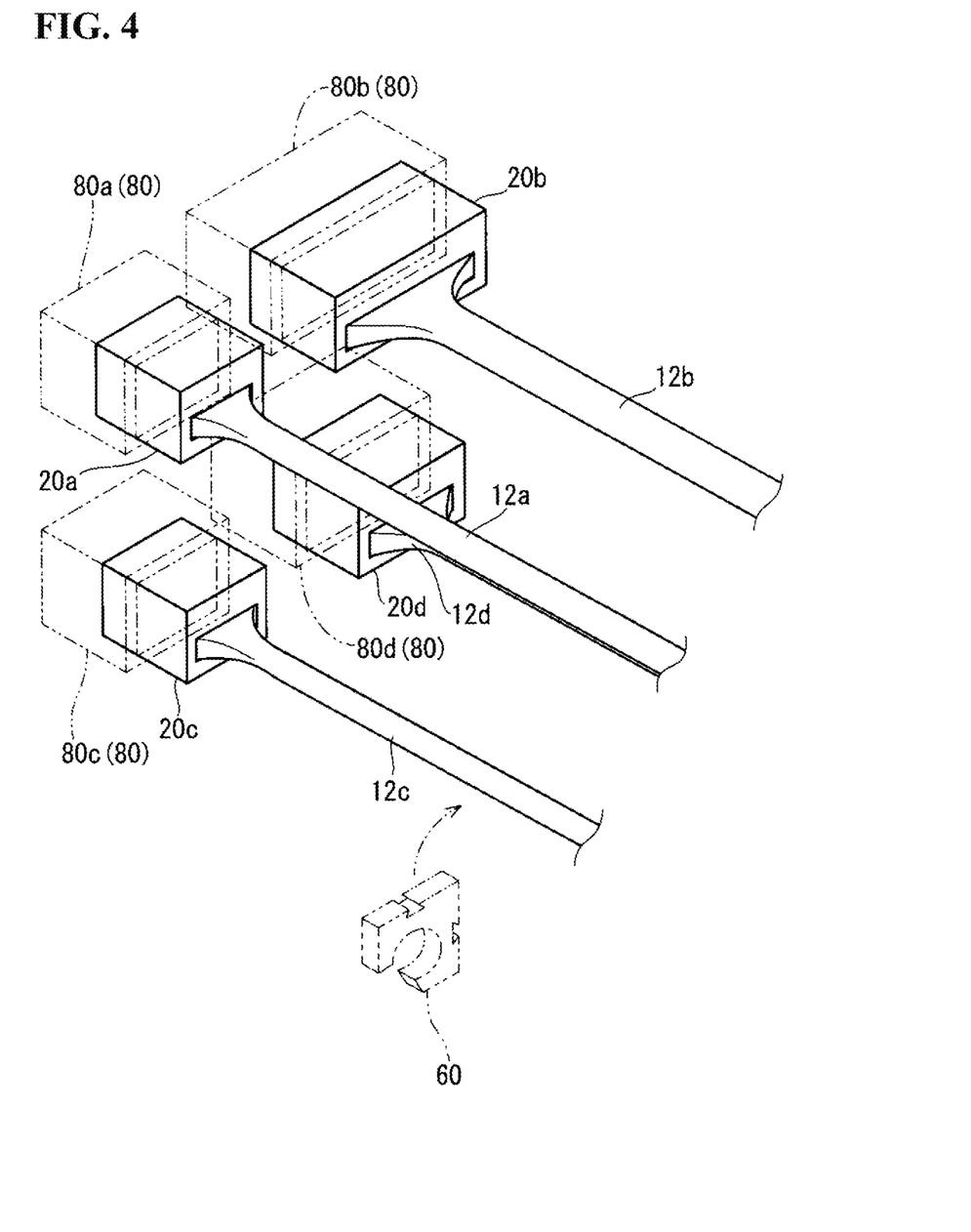
FIG. 4 is an explanatory view showing one production step of a wire harness production method according to the first embodiment.
Figure 5:
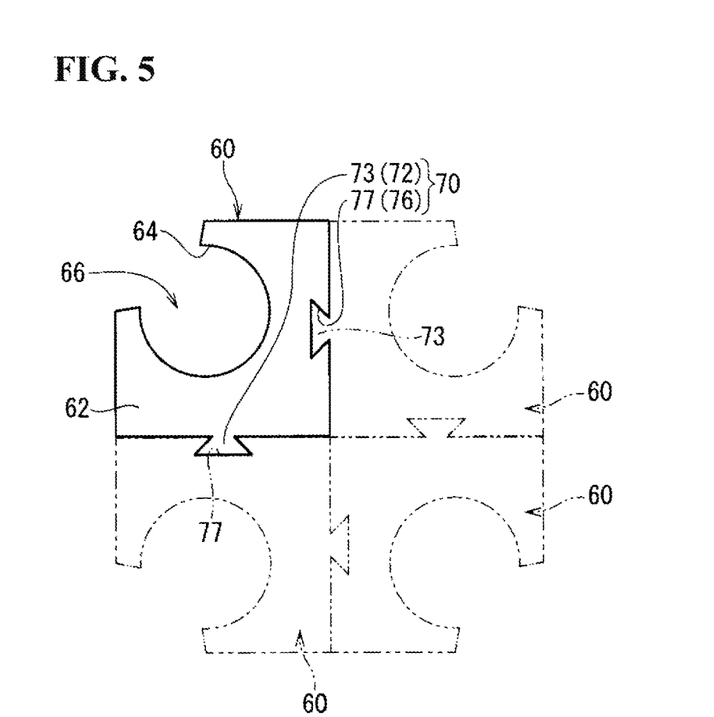
FIG. 5 is a front view showing branch line grouping parts.
Figure 6:
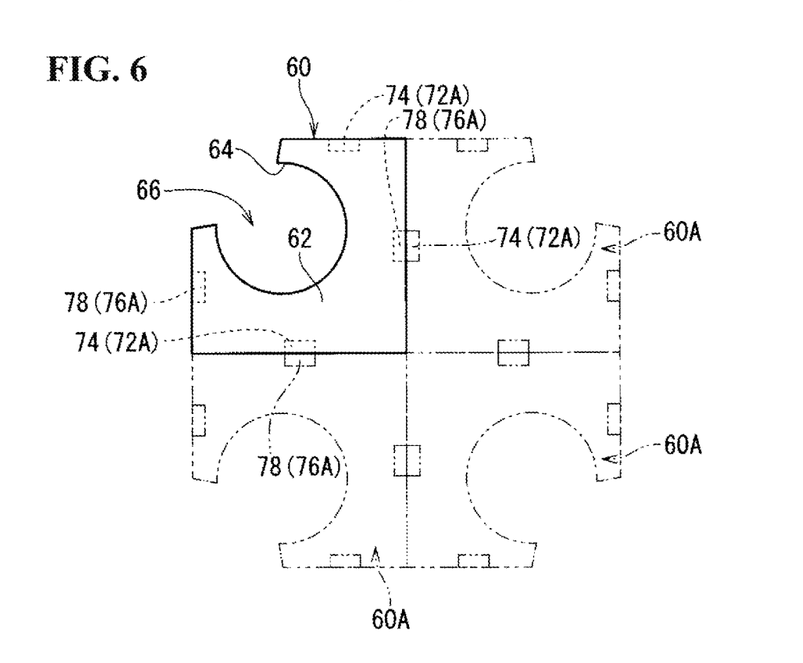
FIG. 6 is a front view showing a modified example of the branch line grouping parts.
Figure 7:
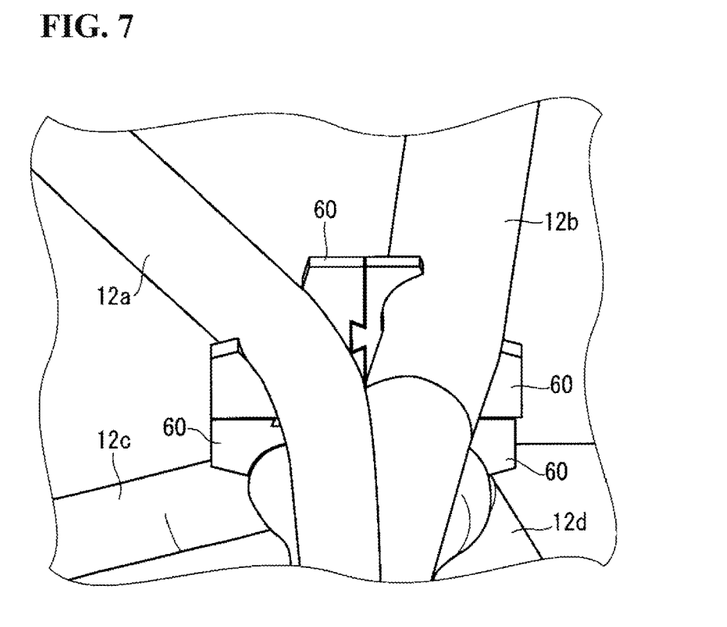
FIG. 7 is an explanatory view showing a state in which the branch line grouping parts respectively attached to terminal-attached electric wires are joined to each other.
Figure 8:
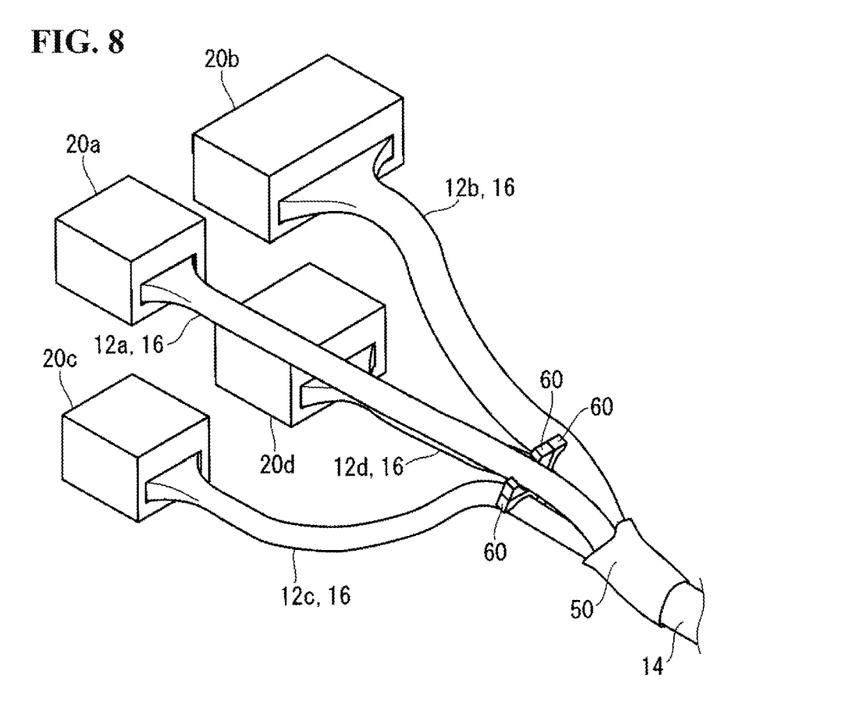
FIG. 8 is an explanatory view showing a state in which the terminal-attached electric wires are bound together at the branch position.
Figure 9:
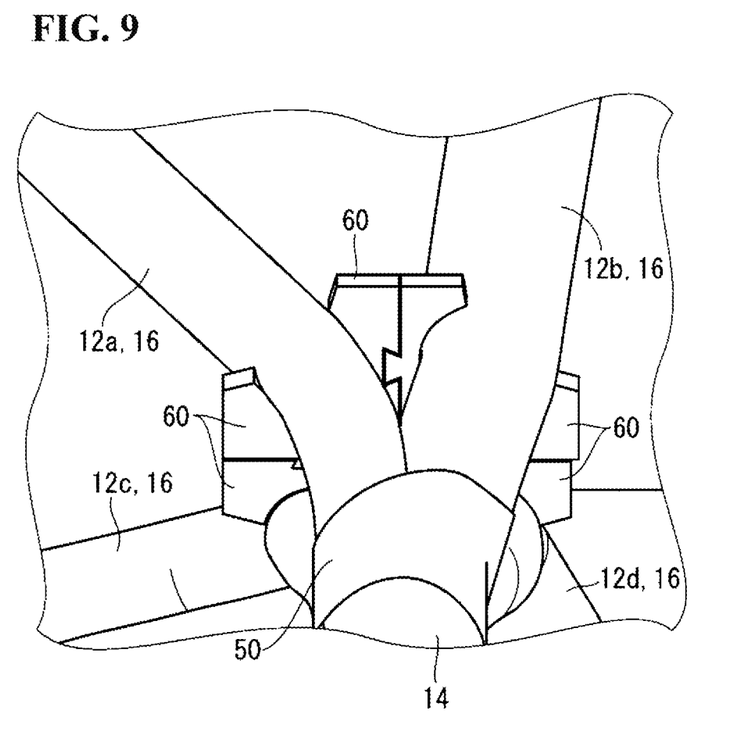
FIG. 9 is an explanatory view showing a state in which the terminal-attached electric wires are bound together at the branch position.

Next, a wire harness production method will be described. FIG. 4 is an explanatory view showing one production step of a wire harness production method according to the first embodiment. FIG. 5 is a front view showing branch line grouping parts 60 used when producing the wire harness 10. FIG. 6 is a front view showing a modified example of the branch line grouping parts 60. FIG. 7 is an explanatory view showing a state in which the branch line grouping parts 60 respectively attached to the terminal-attached electric wires 12 are joined to each other. FIGS. 8 and 9 are explanatory views showing a state in which the terminal-attached electric wires 12 are bound together at the branch position. Note that FIGS. 7 and 9 are partially enlarged front views of the vicinity of the branch position.

In order to produce the wire harness 10, first, a plurality of connectors 20 into which the terminals of the terminal-attached electric wires 12 have been inserted are prepared.

Specifically, in this example, four connectors 20a, 20b, 20c, and 20d are prepared. The terminals of the terminal-attached electric wires 12a, 12b, 12c, and 12d have been respectively inserted into the four connectors 20a, 20b, 20c, and 20d. Note that it is sufficient that each of the terminal-attached electric wires 12a, 12b, 12c, and 12d includes at least one terminal-attached electric wire. In this example, the terminal-attached electric wires 12a, 12b, 12c, and 12d each include a plurality of terminal-attached electric wires, and, after the terminals have been inserted into the connectors 20, the terminal-attached electric wires 12 inserted into each connector 20 are bundled together with tape. At this time, the tape is wrapped using a so-called loose wrapping method in which portions of the tape do not overlap each other. Thus, in this example, it is not expected that the tape will have the function of sufficiently protecting the electric wires. That is to say, each of the terminal-attached electric wires 12a, 12b, 12c, and 12d includes a plurality of terminal-attached electric wires 12 bundled together. Note that the terminal-attached electric wires 12a, 12b, 12c, and 12d do not have to be bundled together, and the terminal-attached electric wires 12a, 12b, 12c, and 12d may not be bundled together.

Next, the plurality of connectors 20 are supported such that a connector 20 is positioned away from one connector 20 in a first direction that is orthogonal to the terminal insertion direction and a connector 20 is positioned away from that one connector 20 in a second direction that is orthogonal to the first direction. In this example, the plurality of connectors 20 are supported at locations thereof when arranged in a vehicle.

Specifically, the connectors 20 may be supported, for example, by using connector supporting tools 80 indicated by the virtual lines in FIG. 4. In this example, each of the connector supporting tools 80 has a box-like main body portion that is larger than each connector 20, and the main body portion is provided with an accommodation cavity in which the connector 20 is to be accommodated. The inner peripheral face of the accommodation cavity is formed to have a shape that conforms to the outer shape of the connector 20.

If the positions of the connector supporting tools 80 that respectively support the connectors 20 are set to be the same as the locations of the connectors 20 when arranged in a vehicle, the connectors 20 are supported at locations thereof when arranged in a vehicle.

More specifically, for example, using a connector supporting tool 80a that supports the connector 20a as a reference, a connector supporting tool 80b that supports the connector 20b is positioned away from the connector 20a in the first direction that is orthogonal to the terminal insertion direction. Furthermore, a connector supporting tool 80c that supports the connector 20c is positioned away from the connector supporting tool 80a in the second direction that is orthogonal to the terminal insertion direction and the first direction. Furthermore, a connector supporting tool 80d that supports the connector 20d is positioned away from the connector supporting tool 80a in the first direction and the second direction.

As described above, there is no limitation on the locations of the connectors 20 when arranged in a vehicle as long as at least the plurality of connectors 20 are arranged in the same order as that when arranged in a vehicle, and the intervals between the connectors 20 may be different from those when installed on a vehicle. Furthermore, the connectors 20 may be shifted in the terminal insertion direction (connector insertion direction) in a state of being installed on a vehicle, but the connectors 20 may be supported at the same position without being shifted in the terminal insertion direction as shown in FIG. 4 when the connectors 20 are supported. However, if the intervals between the connectors 20, the positions thereof in the terminal insertion direction, and the like when the connectors 20 are supported are set to those in a positional relationship when the connectors 20 are actually installed on a vehicle, a wire harness 10 with a shape closer to that when installed in a vehicle can be obtained.

After the connectors 20 are supported by the connector supporting tools 80, the lengths from the connectors 20 are measured to determine the branch position (branch position determining step).

Specifically, when designing the wire harness 10, the distances from the connectors 20 to the branch position (hereinafter, referred to as branch distances) are set. However, electric wires that are to be used are typically obtained by cutting a long electric wire to have predetermined lengths, and thus the branch position is not provided with a mark or the like. Thus, it is difficult to determine the position corresponding to the branch position when the terminal-attached electric wires are inserted into the connectors. Thus, the branch distances are measured in a state where the connectors 20 are supported by the connector supporting tools 80, so that the position that can be used as a reference when binding the terminal-attached electric wires 12 that have been grouped is determined. In this example, the terminal-attached electric wires 12 are provided with a mark such that an operator can see the branch position. Examples of the mark that allows an operator to see the branch position include a clip such as a so-called clothes-pin attached around the sheaths of the electric wires. In this example, later-described branch line grouping parts 60 attached around sheaths are used as a mark.

The position at which the mark is provided may be or not may be the same as the branch position. In the case where the position at which the mark is provided is not the same as the branch position, for example, the position may be set to a position that is positioned away from the branch position by a predetermined distance such as a distance corresponding to the width of the binding tape. In this example, the branch line grouping parts 60 are attached as the mark to positions shifted from the branch position toward the connectors 20.

As described above, in this example, the branch line grouping parts 60 that can be joined to each other are attached around the terminal-attached electric wires 12.

Specifically, as shown in FIG. 5, each branch line grouping part 60 includes a flat plate portion 62, an attachment portion 64, and a joint portion 70.

The flat plate portion 62 is formed in the shape of a flat plate (a flat square plate, in this example), and is a portion corresponding to the main body portion of the branch line grouping part 60.

The attachment portion 64 is a portion that is to be attached to one of the branch line portions 16. In this example, an attachment recess 66 is formed in the flat plate portion 62 as the attachment portion 64. More specifically, the attachment recess 66 is formed in the shape of a circular through hole at a position shifted from the center of the flat plate portion 62 toward one corner thereof, in which the corner is removed such that the through hole is open in the radial direction. At this time, settings are made such that more than half the circumferential edge portion of the through hole is left in the circumferential direction (such that about three-quarters of the circumference are left). Furthermore, the inner diameter of the through hole is set so as to be smaller than the outer diameter of the terminal-attached electric wire 12 (electric wire bundle) to be attached. When attaching the branch line grouping part 60 to the terminal-attached electric wire 12, the attachment is made by press-fitting the terminal-attached electric wire 12 into the attachment recess 66.

The joint portions 70 are portions at which the branch line grouping parts 60 are joined to each other. Each of the joint portions 70 includes a first joint portion 72, and a second joint portion 76 that can be joined to a first joint portion formed on a corresponding branch line grouping part. The first joint portion 72 and the second joint portion 76 are respectively provided on two faces with a corner interposed therebetween, the corner being positioned on the side opposite to the corner that is open on the peripheral face of the flat plate portion 62.

In this example, the joint portions 70 can be joined to each other through an interlocking structure. More specifically, the first joint portion 72 includes a joint projection 73, and the second joint portion 76 includes a joint recess 77.

The joint projection 73 is formed so as to be able to be interlocked with a joint recess formed on a corresponding branch line grouping part. The joint projection 73 is formed so as to project from the peripheral face of the flat plate portion 62, and to have a width that gradually becomes wider toward the end. In a similar manner, the joint recess 77 is formed so as to be able to be interlocked with a joint projection formed on a corresponding branch line grouping part. The joint recess 77 is formed such that part of the peripheral face of the flat plate portion 62 is recessed so as to have a width that gradually becomes wider toward the peripheral face on the opposite side. Furthermore, the joint recess 77 is formed so as to be smaller than the joint projection 73. If the joint projection 73 is press-fitted into the joint recess 77 in the direction that is orthogonal to the main face of the flat plate portion 62, the first joint portion 72 and the second joint portion 76 can be interlocked with each other. At this time, since the joint projection 73 is formed so as to have a width that becomes wider toward the end, the first joint portion 72 and the second joint portion 76 are unlikely to come apart from each other in the direction in which the flat plate portion 62 extends (the direction that is orthogonal to the longitudinal direction of the terminal-attached electric wires 12 to which the branch line grouping parts 60 are attached).

It will be appreciated that the configuration of the branch line grouping parts is not limited to that described above. For example, the joint portions of the branch line grouping parts may be joined to each other using a magnetic force. FIG. 6 shows branch line grouping parts 60A that can be joined to each other using a magnetic force.

That is to say, in each of the branch line grouping parts 60A, magnets 74 and 78 are attached to the flat plate portion 62. The magnets 74 and 78 may be embedded in the flat plate portion 62, or may be attached so as to be exposed to the outside. In this example, the magnets 74 and 78 are attached near the four peripheral faces of the flat plate portion 62. Among the four magnets 74 and 78, two magnets 74 attached to parallel peripheral faces of the flat plate portion 62 are positioned so as to have their N-pole oriented outward, and the remaining two magnets 78 are positioned so as to have their S-pole oriented outward. That is to say, in this example, the magnets 74 function as first joint portions 72A, and the magnets 78 function as second joint portions 76A.

It is conceivable that the branch line grouping parts 60 are attached to, for example, the branch position or a portion near the branch position provided with the above-described mark. Furthermore, for example, it is conceivable that the branch line grouping parts 60 are attached to positions that are positioned away from the position provided with the above-described mark by a predetermined distance. In this example, as described above, the branch line grouping parts 60 are attached as the mark to the positions shifted from the branch position toward the connectors 20.

Next, the branch line grouping parts 60 that have been attached are joined to each other. In this example, the joint projections 73 are interlocked with the joint recesses 77, so that the branch line grouping parts 60 are joined to each other. If the branch line grouping parts 60 are joined to each other, the branch lines are grouped at the branch position or a portion near the branch position, and thus the branch lines can be easily bound together.

Note that, in order to prevent twisting of the terminal-attached electric wires 12 in a state where the branch line grouping parts 60 are joined to each other, when attaching the branch line grouping parts 60 to the terminal-attached electric wires 12 or when joining the branch line grouping parts 60 to each other, for example, the orientations of the branch line grouping parts 60 may be adjusted.

Then, in a state where the plurality of connectors 20 are supported and the branch line grouping parts 60 are joined to each other, the terminal-attached electric wires 12 respectively inserted into the plurality of connectors 20 are bound together at the branch position. In this example, the terminal-attached electric wires 12 are bound together at the branch position determined in the branch position determining step.

As described above, in this example, the branch line grouping parts 60 are attached as the mark functioning as the reference of the branch position to the positions shifted from the branch position toward the connectors 20 by a predetermined distance. That is to say, the position shifted from the branch line grouping parts 60 by the predetermined distance to the side opposite to the connectors 20 is the branch position. Then, as shown in FIGS. 8 and 9, the terminal-attached electric wires 12 are bound together at the branch position. If the terminal-attached electric wires 12 are bound together, the non-bound portions of the terminal-attached electric wires 12a, 12b, 12c, and 12d from the branch position to the connectors 20 function as the branch line portions 16, and the grouped and bound portion of the terminal-attached electric wires 12a, 12b, 12c, and 12d from the branch position to the side opposite to the connectors 20 functions as the trunk line portion 14.

In this example, the branch line grouping parts 60 are formed so as to be able to be attached to and detached from the terminal-attached electric wires 12. Furthermore, the branch line grouping parts 60 are formed such that the interlocking therebetween can be canceled.

As described above, the branch line grouping parts 60 are attached to the terminal-attached electric wires 12 by press-fitting the terminal-attached electric wires 12 (the branch line portions 16) into the attachment recesses 66. Furthermore, in this example, the branch line grouping parts 60 are attached to the terminal-attached electric wires 12 at positions thereof shifted from the branch position toward the connectors 20, and the branch line grouping parts 60 are not bound together with the terminal-attached electric wires 12. Accordingly, the terminal-attached electric wires 12 can be detached from the attachment recesses 66, and thus the branch line grouping parts 60 can be detached from the terminal-attached electric wires 12.

Furthermore, the branch line grouping parts 60 are joined to each other by interlocking the joint projections 73 and the joint recesses 77 with each other. The interlocking between the joint projections 73 and the joint recesses 77 can be canceled. More specifically, each joint projection 73 is press-fitted into the corresponding joint recess 77 in the direction that is orthogonal to the main face of the flat plate portion 62. Thus, if the joint projection 73 is slid along the inner peripheral face of the joint recess 77 in the direction that is orthogonal to the main face of the flat plate portion 62, the interlocking between the joint projection 73 and the joint recess 77 can be canceled, and thus the interlocking between the branch line grouping parts 60 can be canceled.

Then, after being bound together at the branch position, the branch line grouping parts 60 are detached from the terminal-attached electric wires 12, and the interlocking between the branch line grouping parts 60 is canceled.

Specifically, when the terminal-attached electric wires 12 are detached from the attachment recesses 66, the branch line grouping parts 60 are detached from the terminal-attached electric wires 12. Furthermore, when the joint projections 73 are slid along the joint recesses 77 in the direction that is orthogonal to the main faces of the flat plate portions 62, the interlocking between the joint projections 73 and the joint recesses 77 is canceled, and the interlocking between the branch line grouping parts 60 is canceled.

Accordingly, the production of the wire harness 10 according to the first embodiment is complete.

According to the wire harness 10 and the production method thereof according to the first embodiment, the wire harness 10 in which three or more branch line portions 16 branch from a trunk line portion 14 and end portions of the branch line portions 16 are respectively provided with connectors 20 includes a holding member 50 that holds the branch line portions 16 such that a connector 20 is positioned away from one of the three or more connectors 20 in a first direction that is orthogonal to a terminal insertion direction and a connector 20 is positioned away from that one connector 20 in a second direction that is orthogonal to the first direction, when the trunk line portion 14 is held such that the connectors 20 are suspended. Thus, it is possible to obtain a wire harness 10 with a shape closer to that when arranged in a vehicle. Accordingly, the frequency of performing an operation called tuning to readjust a design value of the wire harness 10 can be suppressed. Furthermore, twisting of the electric wires when connecting the connectors 20 can be suppressed, and thus damage to the electric wires can be suppressed.

Furthermore, the holding member 50 includes a binding member for binding the plurality of branch line portions 16. Thus, holding and binding can be simultaneously performed, and thus it is possible to obtain a wire harness 10 with a shape closer to that when arranged in a vehicle.

Furthermore, the three or more connectors 20 are located in a positional relationship of that when arranged in a vehicle, when the trunk line portion 14 is held such that the connectors 20 are suspended. Thus, it is possible to obtain a wire harness 10 with a shape closer to that when arranged in a vehicle.

Furthermore, since the inner sides of branches may be scratched when the wire harness 10 is transported in a two-dimensional form from an assembly plant to a plant where parts are installed on vehicles or the like, the inner sides of the branches have to be protected. More specifically, when the wire harness 10 in which the branch line portions 16 branch from the branch position is formed in a two-dimensional form, typically, the wire harness 10 formed has its bifurcation portions spread wide. Thus, when the wire harness 10 is transported in this state, wide areas of the inner sides of the bifurcation portions are exposed to the outside because the inner sides of the bifurcation portions are spread wide, and thus the inner sides of the bifurcation portions are likely to collide with other members and are likely to be scratched. In order to suppress damage caused by such scratching and the like, conventionally, there are cases where tape has to be wrapped around the inner sides of the bifurcation portions as well.

On the other hand, the wire harness 10 according to the foregoing embodiment is formed in a shape closer to that when installed on a vehicle. Thus, when the wire harness 10 is transported while the locations of the connectors 20 are maintained, the bifurcation portions of the branches are prevented from being spread wide, and thus the inner sides of the bifurcation portions can be prevented from being exposed to the outside. Accordingly, the risk of the inner sides of the bifurcation portions being scratched is reduced. Thus, the need to protect the inner sides of the branch position as well with a wrapping tape or the like can be reduced.

Furthermore, the method further includes a step of attaching the branch line grouping parts 60 that can be joined to each other, around the terminal-attached electric wires 12, and a step of joining the branch line grouping parts 60 to each other. Thus, the wire harness 10 can be easily formed in a shape close to that when arranged in a vehicle.

Furthermore, the branch line grouping parts 60 are formed so as to be able to be attached to and detached from the terminal-attached electric wires 12, and the branch line grouping parts 60 are formed such that the interlocking therebetween can be canceled. Thus, the branch line grouping parts 60 can be repeatedly used by detaching the branch line grouping parts 60 from the terminal-attached electric wires 12 and canceling the interlocking between the branch line grouping parts 60. Furthermore, since the wire harness 10 installed on vehicles is not provided with the branch line grouping parts 60, the weight of the wire harness 10 can be accordingly reduced.

Furthermore, the method further includes a step of, before the binding at the branch position, measuring lengths from the connectors 20, and determining the branch position, wherein, in the binding at the branch position, the binding is performed at the determined branch position. Thus, for example, it is possible to allow robots such as industrial robots that have a self-measuring function to produce the wire harness 10. In this case, a drawing board for producing the wire harness 10 can be omitted, and operations such as transferring the wire harness 10 to a drawing board and the like can be omitted.

Second Embodiment

Figure 10:
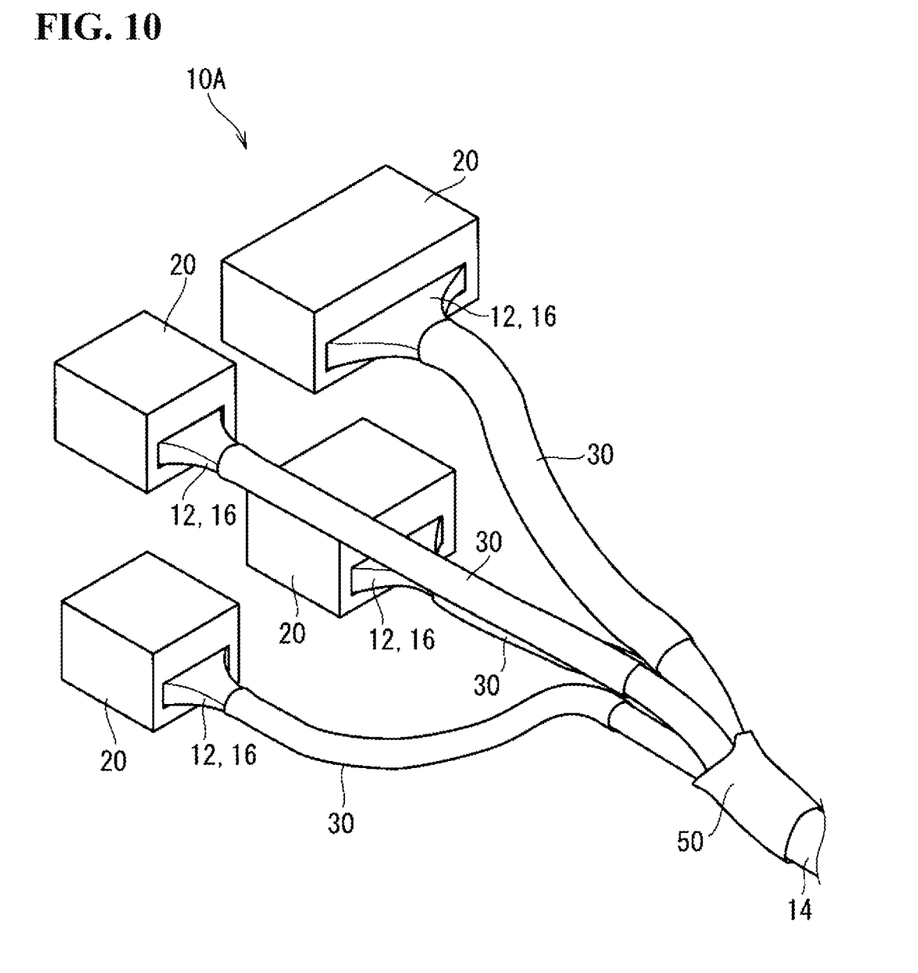
FIG. 10 is a perspective view showing a wire harness according to a second embodiment.

Hereinafter, a wire harness 10A according to the second embodiment will be described. FIG. 10 is a perspective view showing the wire harness 10A according to the second embodiment. In the description of this embodiment, constituent elements similar to those described in the foregoing embodiment are denoted by the same reference numerals, and a description thereof has been omitted (the same can be applied to a third embodiment described later).

The wire harness 10A according to the second embodiment is different from the wire harness 10 according to the first embodiment in that branch line protecting portions 30 are provided respectively around the branch line portions 16.

Specifically, the branch line protecting portions 30 are configured by wrapping tape around the branch line portions 16. The tape is wrapped, for example, using a so-called double wrapping method in which portions of the tape overlap each other. Note that the tape also has a function of binding the portions of the terminal-attached electric wires 12 from the connectors 20 to the branch position.

It will be appreciated that the branch line protecting portions 30 are not limited to tape. The branch line protecting portions may be realized by, for example, wrapping a protective sheet or the like. In this case, the protective sheet may be wrapped over tape wrapped for binding and the like.

In producing the wire harness 10A, if the portions of the terminal-attached electric wires 12 from the connectors 20 to the branch position are provided with the branch line protecting portions 30 before the binding at the branch position, the branch position can be easily specified. In this case, the branch line protecting portions 30 may be regarded as a mark for specifying the branch position. That is to say, it can be assumed that a mark for determining the branch position is provided by attaching the branch line protecting portions 30 to the portions of the terminal-attached electric wires 12 from the connectors 20 to the branch position.

Third Embodiment

Figure 11:
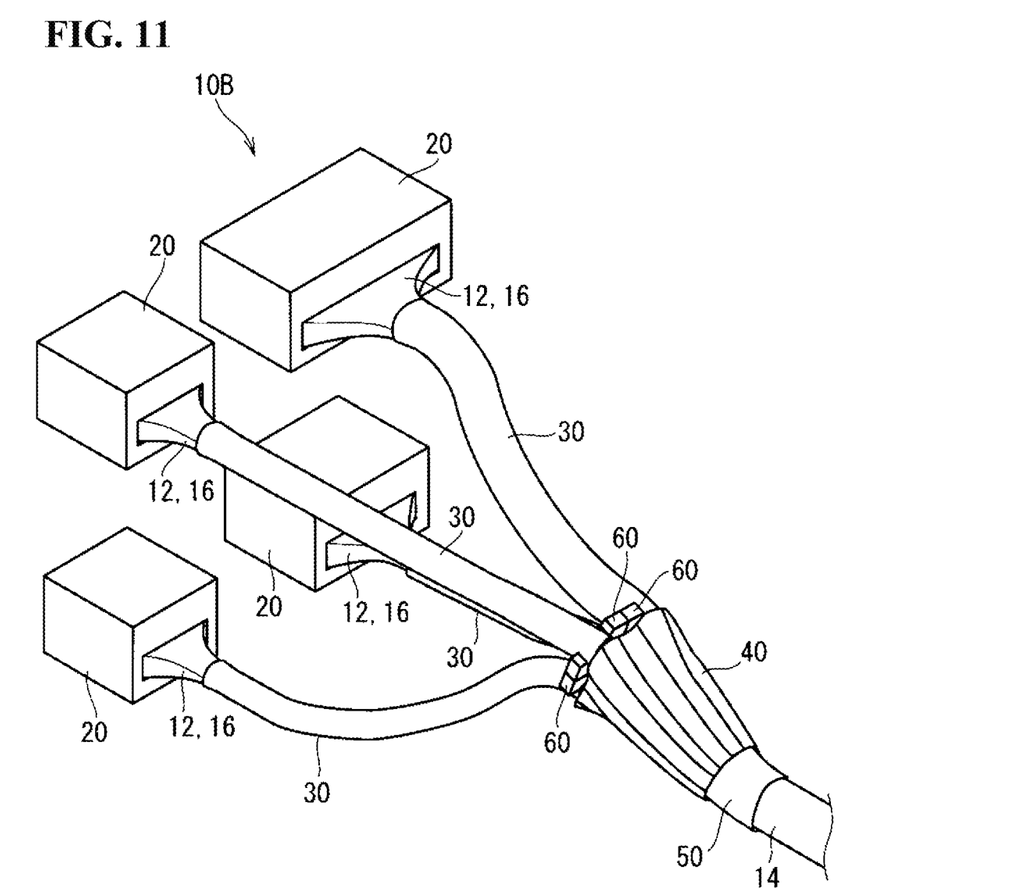
FIG. 11 is an explanatory view showing one production step of a wire harness production method according to a third embodiment.
Figure 12:
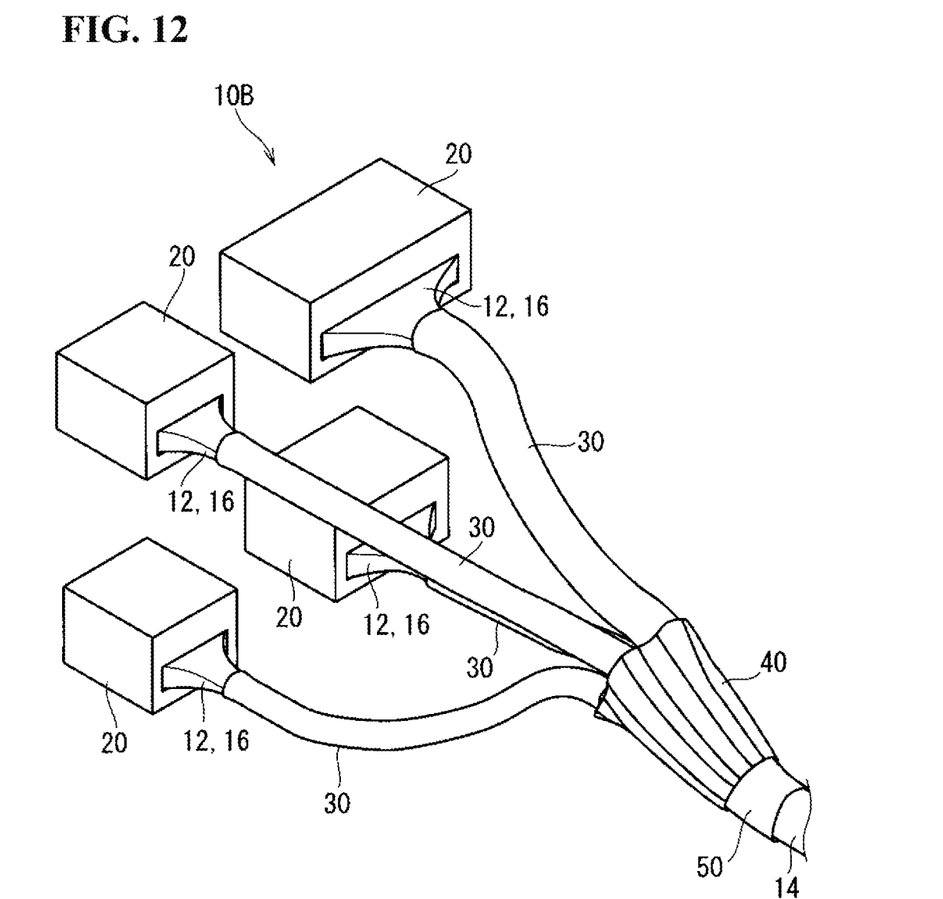
FIG. 12 is a perspective view showing a wire harness according to the third embodiment.

Hereinafter, a wire harness 10B according to the third embodiment will be described. FIG. 11 is an explanatory view showing one production step of a wire harness production method according to the third embodiment. FIG. 12 is a perspective view showing the wire harness 10B according to the third embodiment.

The wire harness 10B according to the third embodiment is different from the wire harness 10 according to the first embodiment, in that the branch line protecting portions 30 for protecting the branch line portions 16 are provided as in the wire harness 10A according to the second embodiment, and further in that a protecting member or protector 40 is attached around the branch position where the branch line portions 16 branch from the trunk line portion 14. Note that the branch line protecting portions 30 are denoted by the same reference numerals as those in the second embodiment, and a description thereof has been omitted.

More specifically, in this example, the protecting member 40 includes a heat shrinkable sheet that shrinks in the width direction when heated. In this example, the heat shrinkable sheet is made of a heat shrinkable resin that shrinks when heated. As shown in FIG. 11, after the binding, the heat shrinkable sheet is wrapped around the branch position in a state where the branch line grouping parts 60 are still attached, and then the sheet is caused to shrink through heating. Accordingly, the heat shrinkable sheet is brought into close contact with the terminal-attached electric wires 12 at the portion thereof around the branch position, and protects that portion. At this time, since the heat shrinkable sheet is in close contact with the terminal-attached electric wires 12, the shape thereof in the vicinity of the branch position can be easily kept in a desired shape. Thus, the risk of the bifurcation portions formed by branching being scratched is further reduced. Accordingly, the need to protect the inner sides of the bifurcation portions with a wrapping tape or the like can be reduced.

At this time, if an adhesive or the like is placed between the heat shrinkable sheet and the terminal-attached electric wires 12, the shape in the vicinity of the branch position can be reliably kept in a desired shape. If an adhesive containing a thermoplastic resin, that is, a so-called hot-melt adhesive is used as the adhesive, bonding also can be performed using the heat applied to cause thermal shrinkage of the heat shrinkable sheet.

It will be appreciated that the protecting member does not necessarily have to be made of a heat shrinkable resin. The protecting member also may be a protective sheet that does not shrink when heated. Furthermore, even in the case where the protecting member is made of a heat shrinkable resin, the resin may be in a form other than a heat shrinkable sheet, such as a heat shrinkable tube, for example.

Furthermore, the protecting member 40 may function also as the holding member 50. That is to say, it is conceivable that only the protecting member 40 is used as the holding member 50.

MODIFIED EXAMPLES

In the foregoing embodiments, it is not always necessary that the branch line grouping parts 60 are formed so as to be able to be attached to and detached from the terminal-attached electric wires 12, and that the branch line grouping parts 60 are formed such that the interlocking therebetween can be canceled. The branch line grouping parts 60 may not be able to be detached from the terminal-attached electric wires 12, and, furthermore, the interlocking between the branch line grouping parts 60 may not be able to be canceled. Furthermore, even in the case where the branch line grouping parts are formed so as to be able to be attached to and detached from the terminal-attached electric wires 12, it is not always necessary that the branch line grouping parts 60 are detached from the terminal-attached electric wires 12. The transportation and the like may be performed in a state where the branch line grouping parts 60 are not detached from the terminal-attached electric wires 12 and the branch line grouping parts 60 are kept attached, and, furthermore, the installation on a vehicle and the like may be performed in the state where the branch line grouping parts 60 are still attached. In this case, the wire harness 10 to which the branch line grouping parts 60 are still attached is as shown in FIG. 8.

In the case where the branch line grouping parts 60 are still attached, the branch line grouping parts 60 function as the holding member 50. That is to say, since the branch line grouping parts 60 are attached, the portions from the branch line grouping parts 60 to the respective ends can be easily kept in a shape closer to that when arranged in a vehicle. In this case, the holding member 50 may not include a binding member. Furthermore, if the holding member 50 includes a binding member, the binding member may be attached also around the branch line grouping parts 60.

Furthermore, in the foregoing embodiments, the connector supporting tools 80 are used to support the connectors 20, but there is no limitation to this. For example, the connectors 20 may be supported by gripping the connectors 20 with a gripping mechanism that can grip the connectors 20.

Furthermore, even in the case where the connector supporting tools 80 are used, it is not always necessary that one connector 20 is supported by one connector supporting tool 80 as shown in FIG. 4. That is to say, a configuration is also possible in which a plurality of connectors 20 are collectively supported by one connector supporting tool 80.

Furthermore, in the foregoing embodiments, it is not always necessary that a recognizable mark is provided for determining the branch position. For example, if the determination of the branch position and the binding are performed by robots or the like, after the branch position has been determined, the binding may be performed without providing a mark.

Furthermore, in the foregoing embodiments, a configuration was described in which, if there are a plurality of terminal-attached electric wires 12 that are inserted into one connector 20, the plurality of terminal-attached electric wires 12 are bundled together at the portions thereof from the connector 20 to the branch position, but there is no limitation to this. Even in the case where there are a plurality of terminal-attached electric wires 12 inserted into one connector 20, the portions from the connector 20 to the branch position may not be bundled together.

Note that the configurations that have been described in the foregoing embodiments and modified examples can be combined as appropriate provided that there is no mutual contradiction.

Although the present invention has been described in detail above, the foregoing description is to be considered in all respects as illustrative, and the present invention is not limited to the foregoing description. It should be understood that innumerable variations that are not described herein can be envisaged without departing from the scope of the present invention.

LIST OF REFERENCE NUMERALS

10 Wire harness
12 Terminal-attached electric wire
14 Branch line portion
16 Trunk line portion
20 Connector
30 Branch line protecting portion
40 Protecting member
50 Holding member
60 Branch line grouping part
64 Attachment portion
70 Joint portion
80 Connector supporting tool

The invention claimed is:

1. A wire harness in which at least three branch line portions branch from a trunk line portion and end portions of each of the branch line portions are respectively provided with connectors, comprising:
   a holder configured to hold the branch line portions such that a first connector of the connectors is positioned away from a second connector of the connectors in a first direction that is orthogonal to a terminal insertion direction and a third connector of the connectors is positioned away from that second connector in a second direction that is orthogonal to the first direction, when the trunk line portion is held such that the connectors are suspended,
   wherein the connectors are located in a positional relationship corresponding to that when arranged in a vehicle, when the trunk line portion is held such that the connectors are suspended,
   the holder includes branch line grouping members configured to be joined to each other,
   the branch line grouping members are respectively attached to the branch line portions, and, when the branch line grouping members are joined to each other, the branch line portions are located in a positional relationship corresponding to that when arranged in a vehicle, and
   the branch line grouping members include magnets, and the branch line grouping members are configured to be joined to each other using the magnets.

2. The wire harness according to claim 1, wherein the holder includes a binder configured to bind the plurality of branch line portions.

3. The wire harness according to claim 1, wherein a protector is attached around a branch position in which the branch line portions branch from the trunk line portion.

4. The wire harness according to claim 3, wherein the protector is made of a heat shrinkable resin.

5. A wire harness production method comprising:
   preparing a plurality of connectors into which terminals of terminal-attached electric wires have been inserted;
   supporting the plurality of connectors such that a first connector of the plurality of connectors is positioned away from a second connector of the plurality of connectors in a first direction that is orthogonal to a terminal insertion direction and a third connector of the plurality of connectors is positioned away from the second connector in a second direction that is orthogonal to the first direction;
   measuring a dimension from the connectors and determining a branch position;
   holding the terminal-attached electric wires respectively inserted into the plurality of connectors, at the determined branch position, in a condition in which the plurality of connectors are supported;
   attaching branch line grouping members configured to be joined to each other, around the terminal-attached electric wires; and
   joining the branch line grouping members to each other, wherein the branch line grouping members are configured so as to be able to be joined to each other using a magnetic force.

6. The wire harness production method according to claim 5, wherein supporting the plurality of connectors includes supporting the plurality of connectors at locations corresponding to their locations when arranged in a vehicle.

7. The wire harness production method according to claim 5,
   wherein the branch line grouping members are configured so as to be able to be attached to and detached from the terminal-attached electric wires, and the branch line grouping members are configured such that interlocking therebetween can be canceled, and
   the method further comprising, after holding the terminal-attached electric wires at the determined branch position, detaching the branch line grouping members from the terminal-attached electric wires, and canceling the interlocking between the branch line grouping members.

8. A wire harness production method comprising:
   preparing a plurality of connectors into which terminals of terminal-attached electric wires have been inserted;
   supporting the plurality of connectors such that a first connector of the plurality of connectors is positioned away from a second connector of the plurality of connectors in a first direction that is orthogonal to a terminal insertion direction and a third connector of the plurality of connectors is positioned away from the second connector in a second direction that is orthogonal to the first direction;
   measuring a dimension from the connectors and determining a branch position;
   holding the terminal-attached electric wires respectively inserted into the plurality of connectors, at the determined branch position, in a condition in which the plurality of connectors are supported;
   attaching branch line grouping members configured to be joined to each other, around the terminal-attached electric wires, each branch line grouping member including a flat plate portion, an attachment portion, and a joint portion to attach the branch line grouping members to each other, each joint portion including a joint projection and a joint recess; and joining the branch line grouping members to each other by interlocking the joint projection to the joint recess on corresponding branch line grouping members, wherein the branch line grouping members are configured so as to be able to be attached to and detached from the terminal-attached electric wires, and the branch line grouping members are configured such that interlocking therebetween can be canceled, and the method further comprising, after holding the terminal-attached electric wires at the determined branch position, detaching the branch line grouping members from the terminal-attached electric wires, and canceling the interlocking between the branch line grouping members.

* * * * *